(12) United States Patent
Avdovic et al.

(10) Patent No.: US 11,354,456 B2
(45) Date of Patent: Jun. 7, 2022

(54) METHOD OF PROVIDING A DATASET FOR THE ADDITIVE MANUFACTURE AND CORRESPONDING QUALITY CONTROL METHOD

(71) Applicant: Siemens Energy Global GmbH & Co. KG, Munich (DE)

(72) Inventors: Pajazit Avdovic, Norrkoping (SE); Jerry Fornander, Finspang (SE); Andreas Graichen, Norrköping (SE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 394 days.

(21) Appl. No.: 16/603,225

(22) PCT Filed: Apr. 12, 2018

(86) PCT No.: PCT/EP2018/059404
§ 371 (c)(1),
(2) Date: Oct. 5, 2019

(87) PCT Pub. No.: WO2018/189301
PCT Pub. Date: Oct. 18, 2018

(65) Prior Publication Data
US 2020/0034498 A1 Jan. 30, 2020

(30) Foreign Application Priority Data

Apr. 13, 2017 (EP) .................................... 17166561
Aug. 9, 2017 (EP) .................................... 17185567

(51) Int. Cl.
*B29C 64/393* (2017.01)
*B33Y 50/02* (2015.01)
(Continued)

(52) U.S. Cl.
CPC ............ *G06F 30/00* (2020.01); *B29C 64/153* (2017.08); *B29C 64/393* (2017.08); *G06N 7/00* (2013.01);
(Continued)

(58) Field of Classification Search
CPC ..... B29C 64/153; B29C 64/393; B33Y 10/00; B33Y 50/02; G05B 19/4099;
(Continued)

(56) References Cited

U.S. PATENT DOCUMENTS 10,052,823 B2    8/2018  Mizes et al.
10,434,572 B2   10/2019  Ljungblad
(Continued)

FOREIGN PATENT DOCUMENTS

CN     105383059 A    3/2016
CN     105500701 A    4/2016
(Continued)

OTHER PUBLICATIONS

Volker Carl: "Independent Monitoring Syystem for the Quality Assessment in Additive Manufacturing"; Carl Messtechnik, Thyssenstrasse 183a, 46535 Dinslaken;; 2015.
(Continued)

*Primary Examiner* — Yuhui R Pan

(57) ABSTRACT

A method of providing a dataset for additive manufacturing includes collecting a first type of data for the dataset during the additive buildup of a at least one layer of a component to be manufactured, evaluating of the structural quality of the layer by the first type of data, modifying the first type of data in that fractions of the data representing an insufficient structural quality of the layer are deleted from the first type of data, and superimposing second type of data, to the first
(Continued)

type of data, wherein the second type of data is suitable to support a validation of the structural quality of the as-manufactured component.

11 Claims, 2 Drawing Sheets

(51) Int. Cl.
- *G06F 30/00* (2020.01)
- *B29C 64/153* (2017.01)
- *G06N 7/00* (2006.01)
- *B33Y 10/00* (2015.01)
- *G06F 119/18* (2020.01)

(52) U.S. Cl.
CPC .............. *B33Y 10/00* (2014.12); *B33Y 50/02* (2014.12); *G06F 2119/18* (2020.01)

(58) Field of Classification Search
CPC .......... G05B 2219/49018; G05B 2219/49023; G06F 2119/18; G06F 30/00; G06N 7/00
See application file for complete search history.

(56) References Cited

U.S. PATENT DOCUMENTS

| | | | |
|---|---|---|---|
| 2002/0097902 A1* | 7/2002 | Roehrig | G06T 5/50 382/132 |
| 2013/0314504 A1 | 11/2013 | Zenzinger et al. | |
| 2015/0024233 A1 | 1/2015 | Gunther | |
| 2015/0045928 A1* | 2/2015 | Perez | B29C 64/112 700/110 |
| 2015/0177158 A1 | 6/2015 | Cheverton | |
| 2015/0321422 A1* | 11/2015 | Boyer | G01J 5/004 264/497 |
| 2016/0018320 A1 | 1/2016 | Hess et al. | |
| 2016/0098825 A1* | 4/2016 | Dave | G06K 9/46 419/53 |
| 2016/0179064 A1 | 6/2016 | Arthur et al. | |
| 2016/0184893 A1 | 6/2016 | Dave et al. | |

FOREIGN PATENT DOCUMENTS

| | | |
|---|---|---|
| CN | 105828985 A | 8/2016 |
| DE | 102015000103 A1 | 7/2016 |
| EP | 2601006 A1 | 6/2013 |
| EP | 2666612 A1 | 11/2013 |
| EP | 2942132 A1 | 11/2015 |

OTHER PUBLICATIONS

PCT International Search Report and Written Opinion of International Searching Authority dated Jul. 6, 2018 corresponding to PCT International Application No. PCT/EP2018/059404 filed Apr. 12, 2018.

* cited by examiner

METHOD OF PROVIDING A DATASET FOR THE ADDITIVE MANUFACTURE AND CORRESPONDING QUALITY CONTROL METHOD

CROSS REFERENCE TO RELATED APPLICATIONS

This application is the US National Stage of International Application No. PCT/EP2018/059404 filed 12 Apr. 2018, and claims the benefit thereof. The International Application claims the benefit of European Application No. EP17166561 filed 13 Apr. 2017 and European Application No. EP17185567 filed 9 Aug. 2017. All of the applications are incorporated by reference herein in their entirety.

FIELD OF INVENTION

The present invention relates to a method of providing a dataset for the additive manufacture of a component and a corresponding quality control method. Further, a corresponding computer program, an AM-method and a correspondingly manufactured component are described.

In particular, the component denotes a component applied in a turbo machine, e.g. in the flow path hardware of a gas turbine. The component is, thus, advantageously made of a superalloy or nickel-based alloy, particularly a precipitation, solution or age hardened alloy.

The term "additive" in the context of manufacturing shall particularly denote a layer-wise, generative and/or bottom-up manufacturing process. The additive manufacturing as described herein may further relate to rapid prototyping.

BACKGROUND OF INVENTION

Additive manufacturing (AM) techniques comprise e.g. powder bed methods, such as selective laser melting (SLM) or selective laser sintering (SLS) or electron beam melting (EBM). These methods are relatively well known methods for fabricating, prototyping or manufacturing parts or components from powder material, for instance. Conventional apparatuses or setups for such methods usually comprise a manufacturing or build platform on which the component is built layer-by-layer after the feeding of a layer of base material which may then be melted, e.g. by the energy of a laser beam and subsequently solidified. The layer thickness is determined by a wiper that moves, e.g. automatically, over the powder bed and removes excess material. Typical layer thicknesses amount to 20 µm or 40 µm. During the manufacture, said laser beam scans over the surface and melts the powder on selected areas which may be predetermined by a CAD-file according to the geometry of the component to be manufactured.

A method of selective laser melting is described in EP 2 601 006 B1, for example.

EP 2 666 612 A1 describes a method of imaging of three-dimensional part which is manufactured by a generative manufacturing method. Said method comprises the steps of capturing at least two layer images of the part during the manufacture via a detection unit which is configured to spatially resolved capture a measure which characterizes an energy input into the part. The method further comprises generating of a 3D image of the part by a means of the captured layer images in a processing unit and finally imaging the 3D part with a display unit.

The term "layer" as used herein shall particularly denote a physical layer or slice of the component to be manufactured as well as a virtual layer or data describing said virtual layer, e.g. in a CAD or image file.

A particular problem in the AM-field is process reproducibility and predictability and validation of structural properties of the as-manufactured material/component.

Today, truly complex or multi-complex correlations, e.g. between any kind of process parameters of physical entities and the structure to be manufactured or its model, cannot easily be visualized at all. Understanding of the reasons e.g. why a 3D-printing or AM-process failed, depends on the AM-technicians experience or extremely time consuming numerical data comparison in a manual manner, if extensive sensor data are present.

A related field of activities is the so called "Optical Tomography" using layered photo or other single-sensor data.

During layerwise additive manufacturing (LAM), e.g. Selective Laser Melting (SLM), complex physical processes influence the outcome of a 3D-print or manufacture. It is today in the vast majority of cases unclear, what physical influences over time and geometry decide the quality of the process. Examples of these influences could be SLM-machine characteristics, gas flow patterns over the powder bed, powder quality, temperature of the powder bed, real layer thickness at the moment of exposure to the beam radiation, laser or beam quality, radiation from the surface of the powder bed and many more.

SUMMARY OF INVENTION

The present invention solves the challenge of how to visualize multi-complex correlations over time and, even more importantly, directly inscribes or provides the according information into a 3D-representation of the part that was printed.

The mentioned object is achieved/solved by the subject-matters of the independent claims. Advantageous embodiments are subject-matter of the dependent claims.

An aspect of the present invention relates to a method of providing a dataset for additive manufacturing comprising the steps of: —collecting a first type of data for the dataset during the additive buildup of a at least one layer of a component to be manufactured, —evaluating and/or modifying of the structural quality of the layer by means of the first type of data, —modifying the first type of data in that fractions of the data representing an insufficient structural quality of the layer are deleted from the first type of data.

Said insufficient structural quality of the layer may pertain to its powdery or granular character, e.g. in regions of the powder layer in which no solidification is intended according to the predetermined geometry of the part. Additionally or alternatively, poor structural quality of regions of the powder bed already exposed to the energy beam may be addressed, such as solidification and/or process failure.

The method further comprises superimposing, e.g. captured or pre-defined, second type of data, to the first type of data, wherein the second type of data is suitable to support a validation of the structural quality of the as-manufactured component.

The term "suitable" shall particularly mean in the given context that observation and/or variation of the given type of data (second type) gives rise to structural changes of in the as-manufactured part.

It is further to be understood that also the first type of data, such as, e.g. optical image information, is of course suitable to support or allow for a validation of structural quality.

An advantage of the presented idea is to make multiple and complex sensor data accessible in graphical form as an overlay in three dimensions for the purpose of deep process understanding, in-line process monitoring, autonomous real time process control and/or machine learning. In-situ as well as ex-situ monitoring of the particular additive manufacturing process may be facilitated by means of the present invention.

Optical Tomography gives the user a good glimpse or deep insights into the 3D build process or process history. Via a deep process understanding which allows for reproducible and reliable prediction of structural, mechanical and/or thermo-mechanical properties of the as-manufactured part, it is possible to dispense with expensive non-destructive testing methods like ultrasonic or x-ray testing after the process. The graphical representation of potential imperfections e.g. by spatially or layerwise resolved optical microscopy only as such is a good step into the right direction, but stays short at "only" showing the fact that there is an imperfection or defect. Even if further parameters, such as parameters of an energy beam or heat entry into the powder bed, are correlated with said optical or image data in a layerwise manner, this does not yet allow for a deep process understanding as is intended in the present invention.

The present invention goes much further, because it much more helps to explain why an imperfection or process failure has happened. The presented idea accomplishes by means of the providing of the dataset, in contrast to imaging methods of the prior art, to provide for an (almost) true digital twin of an individual component manufactured by AM.

Moreover, when fully implemented, the present invention will provide for an augmented AM manufacturing process, in fact online, i.e. while it is performed (real time control) and, ultimately, prevent similar process deviations from happening before they occur.

The given means solve crucial needs of today's manufacturing technology, i.e. better AM process reproducibility and structural understanding. Additive manufacturing processes are today subject to great, even disruptive changes due to ever increasing importance of digitalisation and/or the increasing impact of industry 4.0 or the Internet of Things.

The need for better process understanding becomes even more apparent when it comes to the additive manufacture of geometrical complex components and/or structures e.g. comprising sophisticated (alloy) compositions. Thermally stressed parts of turbines made of superalloys are, e.g. required to provide excellent mechanical strength, resistance to thermal creep deformation, good surface stability, and resistance to corrosion or oxidation. Development of superalloy components thus heavily relies on physical, chemical and, particularly process innovations.

A further aspect of the present invention relates to a quality control method making use of or comprising the dataset as described.

In an embodiment the first type of data comprises optical or image data or information, microscopical data, CAD data, such as geometrical information, CAM-data and numerical control data of or for the layer.

In an embodiment, the second and/or a further type of data, such as a third type of data, comprise information, such as temperature, pressure, gas flow, beam properties are about a melt pool or powder bed, collected or read out from the manufacturing device or further sensor device of or for the layer.

In an embodiment, the second type of data and further, third type of data are collected and superimposed with the first type of data. This embodiment further addresses to solve the inventive problems.

In an embodiment the second type of data and/or the third type of data can be toggled on and off in a data processing device in order to validate the structural quality of an as-manufactured layer of or for the component.

In an embodiment, an algorithm captures regions of unsolidified or erroneously solidified powder in the powder bed in each layer for the component. By this embodiment, the modification of the first type of data as described above can thus expediently be carried out.

In an embodiment, the dataset is a visual and/or a tomographical 3D-dataset of the as manufactured component.

In an embodiment, a coloured, textured or otherwise graphically enhanced 3D representation of the dataset is generated. This allows e.g. an operator of a manufacturing device to administer or study the dataset, consequently the digital twin of the component or the manufacturing process in an expedient way.

In an embodiment the different and/or superimposed types of data are subjected to correlation algorithms, e.g. with the aid of mathematical methods, and wherein these correlated information is in turn put into machine learning algorithms.

Further aspect of the present invention relates to a quality control method comprising the dataset and/or method of providing the same as described above.

A further aspect of the present invention relates to a computer program which—when being executed—is suitable to instruct a data processing device to carry out at least some of the method steps.

A further aspect of the present invention relates to a method of additive manufacturing of a component, wherein the quality control method and/or the method of providing is applied.

A further aspect of the present invention relates to a component additively manufactured or manufacturable by the method of additive manufacturing as described.

Advantages relating to the described method of providing, the computer program and/or the described quality control method may as well pertain to the method of additive manufacturing and/or the component, or vice versa.

BRIEF DESCRIPTION OF THE DRAWINGS

Further features, expediencies and advantages refinements become apparent from the following description of the exemplary embodiment in connection with the Figures.

Like elements, elements of the same kind and identically acting elements may be provided with the same reference numerals in the Figures.

DETAILED DESCRIPTION OF INVENTION

Figure 1:
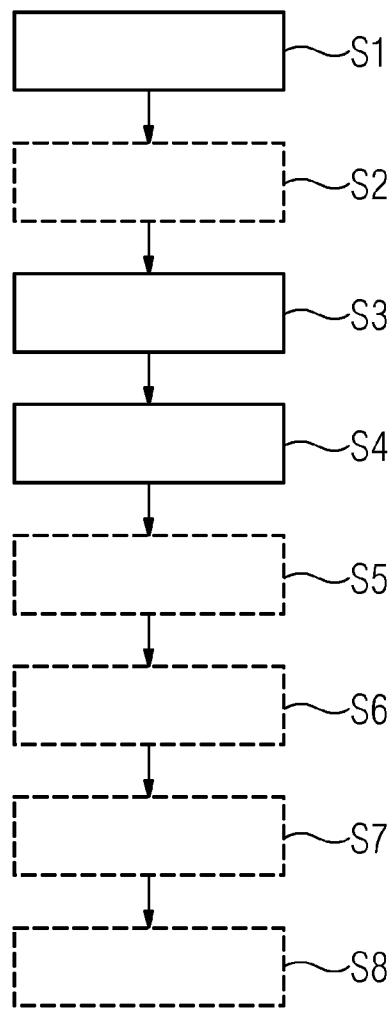
FIG. 1 shows a simplified flowchart, illustrating method steps of the presented method.
Figure 3:
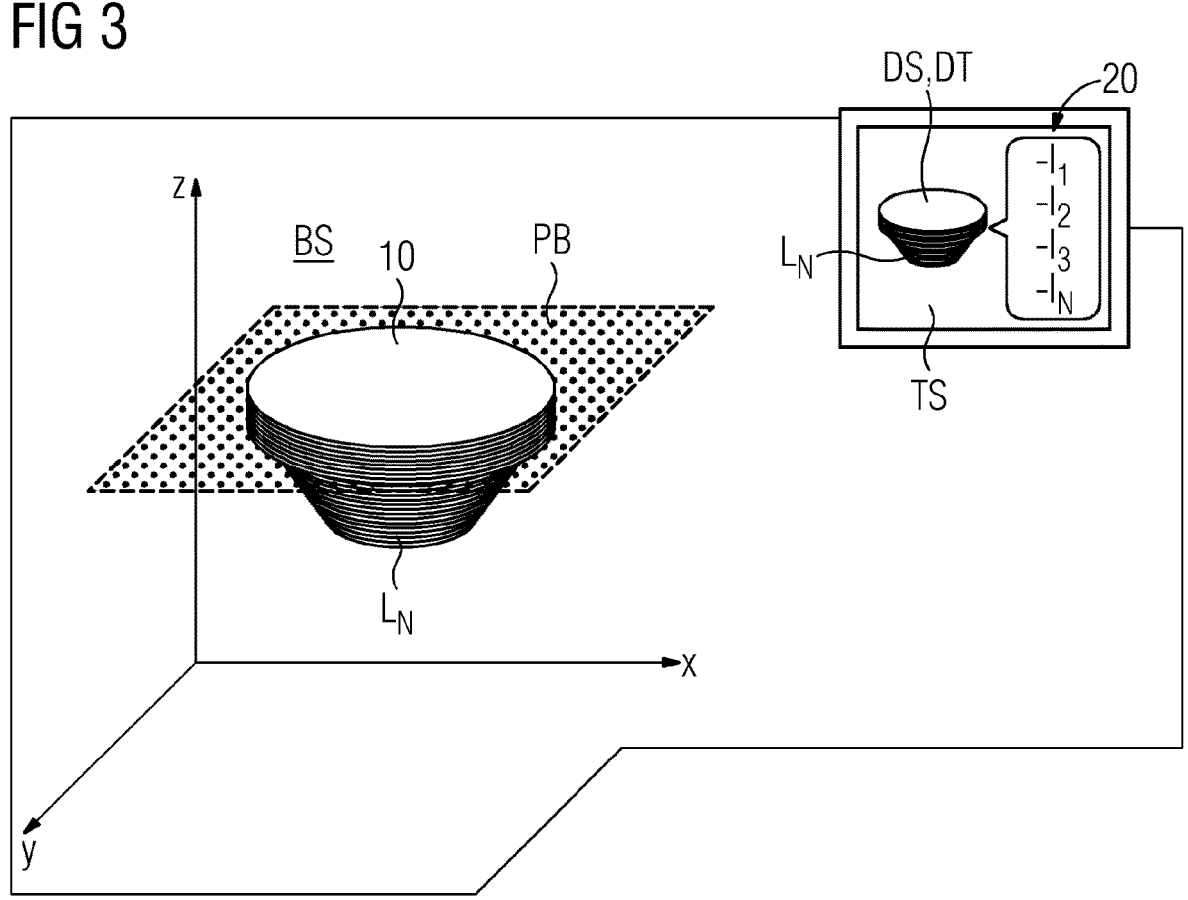
FIG. 3 indicates an additive manufacturing device in a schematic.

FIG. 1 shows particularly flowchart of the following steps by which a dataset (cf. DS below) is provided:

Step 1 (S1): Each layer of a layerwise additive manufacturing process (LAM) is documented by means of photography (first type of data, cf. I1 below), most likely by a camera with more or less high dimensional resolution, located in the chamber roof, i.e. in the upper part of a build space BS as shown in FIG. 3, for example. This gives the possibility to create a three dimensional (data) model if the spacing in z-direction is identical to the layer thickness of the CAM-file that was sent to the 3D-printer or AM-manufacturing device. The step S1 may relate to the step of collecting the first type of data, as described above.

Step 2 (S2) being optional (cf. dashed contour): An algorithm e.g. identifies or evaluates in each picture what parts of each picture are unaffected (unsolidified) in the powder bed (or fluid in case of stereo-lithography as AM-process). In this way, the algorithm, which may be known to a skilled person, also evaluates structural quality of the respective layer. This identification of unsolidified powder bed sections advantageously takes place directly after the taking of each individual picture (in-line monitoring). If step S2 is omitted, then the focus of the analytics is not solely directed to the part to be printed, but can also be used for the inclusion of powder bed related phenomena into the analytics work.

Step 3 (S3): The powder bed sections of each picture are deducted or deleted from the pixel-representation of each picture. This deletion of unsolidified powder bed sections from each picture takes place directly after the taking of each individual picture. Step S3 may be a real-time calculation and further relate to the step of modifying the first type of data, as described above.

Step 4 (S4): Onto each of the prepared pictures from steps 1 to 3, one or more additional sensor data (second and/or third type of data, cf. I2, I3 below) types are collected and/or superimposed in graphical form. As an example, one could imagine temperature readings from an additional infra-red camera. By doing so, additional sensor data can be visualized not only in the correct temporal correlation ("so and so many seconds into the print") but also directly in the correct spatial order: E.g., In layer 2333 of the buildup for the component, a change from sensor data X1 (see below) occurred, showing that the approved tolerance band for X1 (="good process") was abandoned—that is why the build crashed in the layer 2334."

Step 5 (S5) being optional: Toggling on and off of one or several or all but one additional sensor data sets gives the precondition for a deeper understanding to the human AM-technician or operator.

Step 6 (S6) being optional: A colored, textured or in other form graphically enhanced 3D-representation of the combination of the layered photographic evidences of the build plus one or several additional sensor data sets in graphical form superimposed onto the right layer picture can then be used for virtual "fly-throughs", study or evaluation of the dataset. This way of making accessible complex correlations has shown to be effective for deep material or structural insights.

Step 7 (S7) being optional: The identified correlations from step 5 and 6 can then be described in mathematical models and algorithms.

Step 8 (S8) being optional: The algorithms and mathematical models as described above can then be used for machine learning exercises.

The present dataset may be in the ".jz"-format and provide all information relevant to reproducibly and comprehensively describe an AM manufacturing process. Said dataset may as well be or comprise CAM-data.

The described method steps may as well be applied in the presented quality control method and/or the method of additively manufacturing of a component (not explicitly indicated in the Figures).

Figure 2:
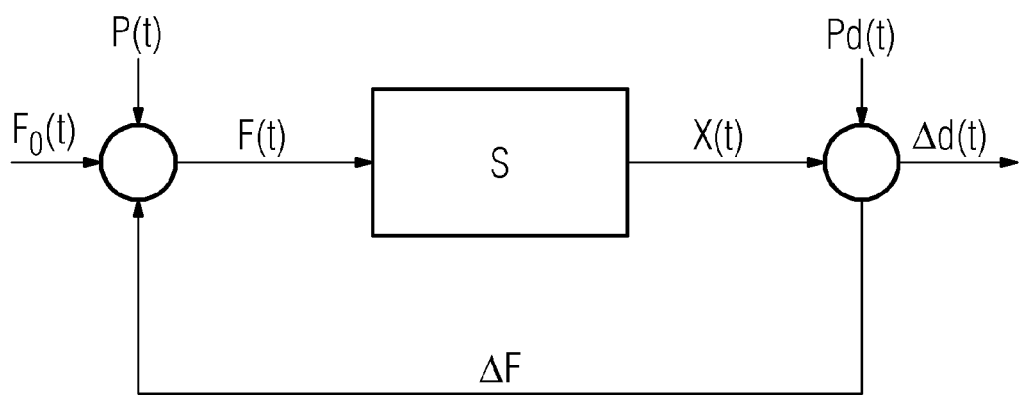
FIG. 2 shows a schematic pictogram of the idea of the presented method.

The pictogram of FIG. 2 shows a representation or dataset identifying characteristics of an AM-printing process, i.e. the dynamic parameters describing a transfer function of the subsystem represented by the printing process.

$F_0(t)$ (see below) may represent or comprise the following parameters: Powder properties, inert gas flow, laser properties etc. as a function of time.

$\Delta d(t)$ may on the other hand describe the deviation of the component, concerning imperfections included in the manufacture, thus a geometrical integrity check inspection.

The provided dataset described herein or a corresponding tool, or processing device may further enable an operator, to use said tool or device (cf. numeral 100 in FIG. 3) without specific physical or chemical knowledge.

The operator shall further be enabled to online influence the manufacturing process (adaptive process), e.g. to increase and decrease of building speed depending of complexity and analyze the component or a specific layer thereof in terms of geometry, dimensions, surface integrity, and also to report data or finding of specific interest.

The parameters as shown in the pictogram of FIG. 2 may be characterized as follows:

$X(t)$: The relative displacement between Laser and CAD model.

$F(t)$: The instantaneous value and $F_0(t)$—The nominal value $\Delta d(t)$: Total deviation of the relative displacement $X(t)$ $P(t)$ and $Pd(t)$ are disturbances as thermal dilation, variation of parameter building speed, thickness etc.

The parameter $\Delta F$ may denote a correlation factor, as shown in FIG. 2, such as: the building speed, the argon or inertial gas feed/speed, information concerning the CAD model, melt pool or its dynamics, the powder bed, the optical and/or microscopical picture or image of an as-manufactured layer, the layer thickness, the recoater feed/speed and/or any information concerning the manufacturing execution system (MES), for example.

Said correlation factor may as well denote or describe information concerning to a post-manufacture (structural and/or chemical) analysis, such as computed tomography, electron microscopy or further means.

The parameter $\Delta d(t)$ may denote differences of the as-manufactured component or its structure as compared to a corresponding CAD-model.

The presented method of providing the dataset may be method of visualising, controlling or monitoring properties of an AM-manufactured component. The presented process may be an adaptive and/or interactive process, by means of which the manufacturing buildup of the component can be supervised and/or online controlled. E.g., when a certain threshold or tolerance of imperfection, more particularly rupture in the structure of the component, is exceeded, process parameters may be adapted online, i.e. during the buildup of the component.

The presented method allows using this method or tool (when implemented in a data processing device) without specific knowledge concerning the structure or the materials of the as-manufactured component itself.

Further, all information necessary may be shown on the screen, such as a touchscreen.

There is also the possibility to turn and touch the component in the model.

Further, process parameters may be read or edited inside as well as outside of the structure to be manufactured.

FIG. 3 indicates an additive manufacturing device 100 in a schematic way. The device comprises or provides a three-dimensional build space BS (cf. coordinate system with translational dimensions x, y, and z on the left). In the build space BS, a component 10 is arranged, advantageously in a state in which it is actually being manufactured by an additive process, such as selective laser melting out of a powder bed PB. Thereby, the component 10 is manufactured by a plurality of layers $L_N$ as indicated. The number of layers can easily reach the number of one thousand or even ten thousand or more.

In the upper right corner of the device 100, a display 20, particularly comprising a touchscreen TS, is shown, showing a digital (image) data of the component 10.

Information or data of the presented dataset may be edited, modified, scrolled-through, varied or changed, e.g. with regard to its values and orientation by means of the touchscreen TS for obtaining knowledge on the as-built structure of the component 10. The image of the component 10 may be part of the dataset DS or data structure. Synonymously with the dataset DS, a digital twin DT for or of the component 10 may be referenced. Said dataset DS is—in other words—advantageously a visual, graphical and/or tomographical 3D dataset of the component 10.

As on the left in the physical component 10 in the build space BS, the component (or digital model thereof) on the right side of FIG. 3 is subdivided in layers $L_N$.

According to the present invention, each layer comprises a set of subdata or information I1, I2, I3 up to IN. Said data or information may relate to optical or image data, microscopic data, CAD-data, such as geometrical information, CAM-data and/or numerical control data and/or information of temperature, pressure, gas flow or about the melt pool a powder bed of or for the layer. I1, I2, I3 up to IN may as well relate to any information as described herein with regard to FIG. 2.

For example I1 may denote optical image data of an as-manufactured layer. Alternatively, micrographs or other microscopical image information may be comprised by I1. Advantageously, one image is recorded per layer $L_N$ during the additive buildup of the component 10, so that, for the whole component, N images are collected and stored only for subdata I1, e.g. in a data processing device. Reference I2 may e.g. denote temperature or pressure data any further data as mentioned above.

At least the data I1 and I2 are then, according to the present invention, advantageously superimposed as indicated by the bubble in the graphical display 20, such that the inventive advantages can be exploited.

The mentioned subdata I1, I2, IN may further be subjected to correlation algorithms with the aid of mathematical methods. Thereby, correlated information or further collected data may in turn be exposed to machine learning algorithms as to allow for most expedient and authentic investigation of process and material properties by means of the "digital twin" of the dataset DS provided by the present invention.

The number of parameters accordingly describing or (comprehensively) characterizing a layer for a structurally sophisticated component 10 may easily exceed the number of 100. Just to give further examples of the mentioned values I1, I2 to IN, said information or pieces of information may relate to: Layer thickness, melt pool geometry, heat impact per volume or area unit, laser wavelength, hatching distance, i.e. distance of adjacent scanning lines, beam speed, geometry of beam spot, beam angle, type of purge gas, flow rate of purge gas, flow rate of possible exhaustion gas, states of gas valves, set ambient pressure prior to or during build job, state of base material, i.e. the quality, and many more.

By means of the parameters, values or information that can be assigned to each layer as described, it becomes apparent that a comprehensively quality control means of the component 10 can also be provided by the dataset by means of which "quality", as e.g. mechanical structure and chemical composition can also be controlled retroactively when scanning or scrolling through the different layers $L_N$ of the dataset DS after the complete manufacture of the component 10. As single pieces of information (cf. e.g. I3, IN) may be deactivated or toggled on and off in the dataset DS, the presented method or dataset further allows for analytical process improvements.

The scope of protection of the invention is not limited to the examples given hereinabove. The invention is embodied in each novel characteristic and each combination of characteristics, which particularly includes every combination of any features which are stated in the claims, even if this feature or this combination of features is not explicitly stated in the claims or in the examples.

The invention claimed is:

1. A method of providing a dataset for additive manufacturing comprising:
    collecting a first type of data for the dataset during an additive buildup of at least one layer of a component to be manufactured,
    evaluating a structural quality of the layer by means of the first type of data,
    modifying the first type of data in that fractions of the data representing an insufficient structural quality of the layer are deleted from the first type of data,
    wherein an algorithm captures regions of unsolidified or erroneously solidified powder in a powder bed in each layer for the component,
    superimposing a second type of data, to the modified first type of data, wherein the second type of data is suitable to support a validation of the structural quality of an as-manufactured component, and
    superimposing a third type of collected data on the modified first type of data,
    wherein the second type of data and/or the third type of data are toggleable on and off in a data processing device to validate the structural quality of the as-manufactured layer of the component.

2. The method according to claim 1,
    wherein the first type of data comprises optical or image data, microscopical data, CAD-data including geometrical information, CAM-data and/or numerical control data of or for the layer.

3. The method according to claim 1,
    wherein the second type of data and/or a further type of data comprises temperature, pressure or gas flow information, or information about beam properties or about a melt pool or powder bed, collected or read out from a manufacturing device or a further sensor devices of or for the layer.

4. The method according to claim 1,
    wherein the dataset is a graphical and/or a tomographical 3D-data set of the as-manufactured component.

5. The method according to claim 1,
    wherein a coloured, textured or otherwise graphically enhanced 3D representation of the dataset is generated.

6. The method according to claim 1,
    wherein the different and/or superimposed types of data are subjected to correlation algorithms, and/or with the aid of mathematical models, and wherein correlated information is in turn put into machine learning algorithms.

7. A quality control method for the additive manufacture of a component comprising:

providing a dataset according to the method of claim 1; and validating the structural quality of the as-manufactured component based on the provided dataset.

8. The method according to claim 1, further comprising: additively manufacturing the component.

9. The method according to claim 1, further comprising:

validating the structural quality of the as-manufactured component based on the dataset.

10. A method of additive manufacturing a component, applying the method of providing the dataset according to claim 1.

11. A method of additive manufacturing a component, applying the quality control method according to claim 7.

* * * * *